(12) United States Patent
Kazama et al.

(10) Patent No.: US 7,006,721 B2
(45) Date of Patent: Feb. 28, 2006

(54) OPTICAL SWITCH AND BEAM DIRECTION MODULE

(75) Inventors: Atsushi Kazama, Chiyoda (JP); Yasuhiro Itou, Kumagaya (JP); Tadaaki Ishikawa, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 10/417,104

(22) Filed: Apr. 17, 2003

(65) Prior Publication Data
US 2004/0105616 A1  Jun. 3, 2004

(30) Foreign Application Priority Data
Apr. 17, 2002 (JP) .............................. 2002-114099

(51) Int. Cl.
*G02B 6/26* (2006.01)
*G02B 6/46* (2006.01)

(52) U.S. Cl. .......................................... 385/18; 385/16
(58) Field of Classification Search ............ 385/15–18, 385/89
See application file for complete search history.

(56) References Cited

U.S. PATENT DOCUMENTS

| | | | | |
|---|---|---|---|---|
| 6,347,167 B1 * | 2/2002 | Hagelin | ....................... | 385/18 |
| 6,411,751 B1 * | 6/2002 | Giles et al. | .................. | 385/16 |
| 6,587,611 B1 * | 7/2003 | Hunt | .......................... | 385/18 |

* cited by examiner

*Primary Examiner*—Frank G. Font
*Assistant Examiner*—Mary El-Shammaa
(74) *Attorney, Agent, or Firm*—Antonelli, Terry, Stout & Kraus, LLP.

(57) ABSTRACT

In a three-dimensional multi-channel optical switch using biaxially movable mirrors, a mirror packing density is improved to support an increased number of channels. The three-dimensional optical switch comprises a fiber collimator array, and a first mirror array and a second mirror array disposed in close proximity to a beam emission surface of the fiber collimator array. The first mirror array has arranged thereon a plurality of first mirrors each having a single rotation axis and a plurality of first windows. The second mirror array has arranged thereon a plurality of second mirrors each having a single rotation axis orthogonal to the first rotation axis and a plurality of second windows. A beam emitted from a fiber collimator passes through the first window, reflects on a fixed mirror and a movable mirror in order, passes through the second window, and exits to the outside.

10 Claims, 14 Drawing Sheets

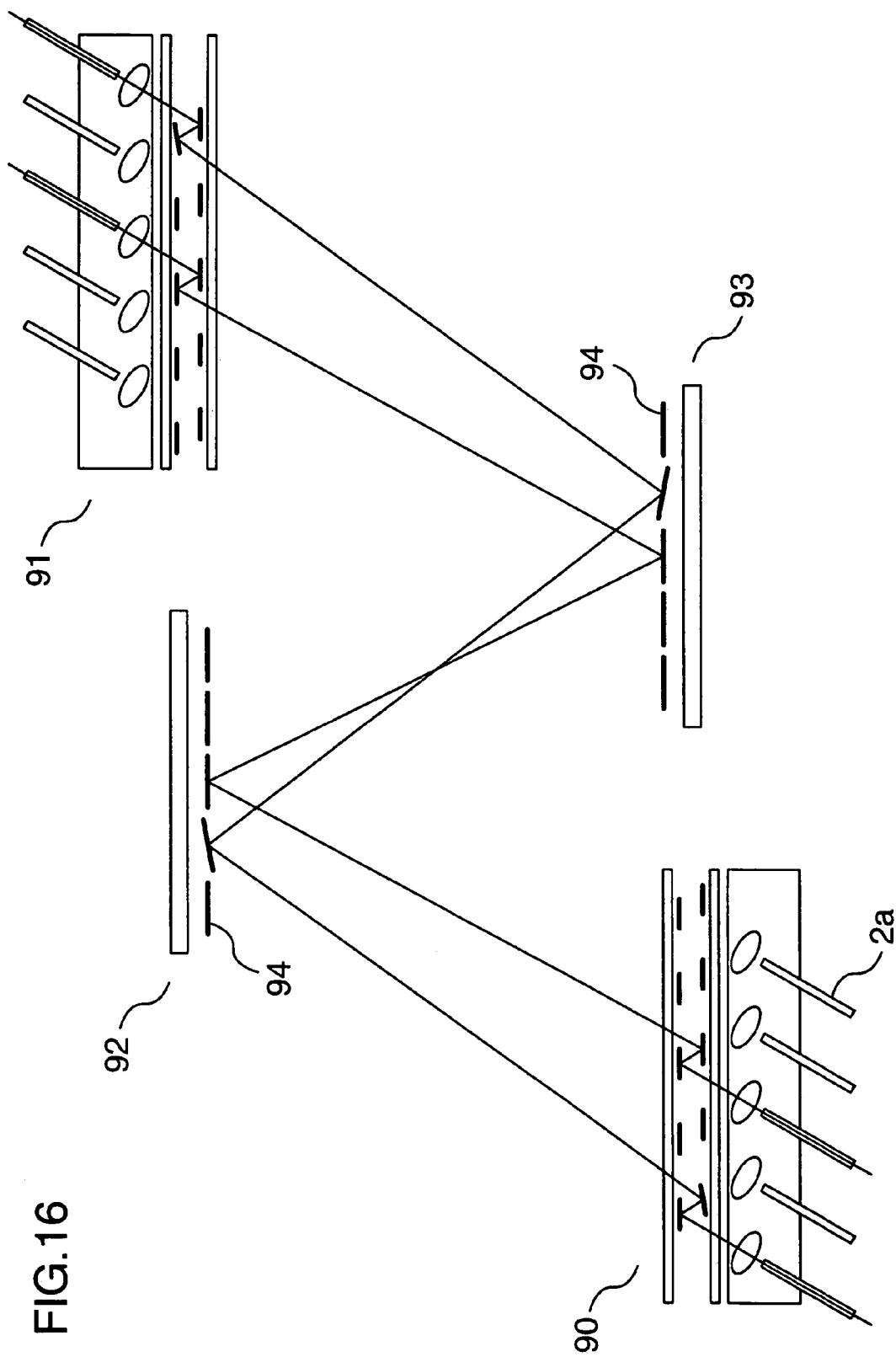

OPTICAL SWITCH AND BEAM DIRECTION MODULE

BACKGROUND OF THE INVENTION

The present invention relates to an optical switch for switching connections of optical signals transmitted through a plurality of optical fibers, and more particularly to a three-dimensional optical matrix switch which employs mirrors for controlling the direction of each optical beam signal.

In fiber-based optical communications, an N×N optical switch is employed for connecting arbitrary one of optical signals transmitted to N input ports through optical fibers to one of N output ports. The optical switch can change over these connections.

U.S. Pat. No. 6,347,167 describes a three-dimensional optical matrix switch which uses a fiber collimator array and a mirror array to form optical paths.

The three-dimensional optical matrix switch described in U.S. Pat. No. 6,347,167 comprises a housing in which fibers and collimator lenses are arranged; a substrate on which input micromirrors and output micromirrors are arranged on the same surface; and a cap formed with a reflecting surface. These components are arranged in parallel with one another. A beam exiting from a lens transmits the substrate, reflects on the reflecting surface of the cap, and reflects on one of the input micromirrors. Then, the beam is emitted from the cap. The beam is further folded back by a reflection on a second cap, reflects on one of the output micromirrors, and couples to an output fiber through a path similar to the input side.

However, since the optical matrix switch described in U.S. Pat. No. 6,347,167 must provide a beam passing region on the surface on which the mirrors are arranged, the mirrors are packed at a lower density. Due to limitations in an optical path length between input and output fibers (working distance) and a maximally deflectable angle of the mirrors, a reduction in the mirror packing density results in a less number of channels which can be coupled by the optical matrix switch.

BRIEF SUMMARY OF THE INVENTION

It is an object of the present invention to provide a three-dimensional optical switch which is capable of overcoming the foregoing problem and improving a mirror packing density.

To achieve the above object, the present invention includes, for example, the following aspects in configuration.

(1) A plurality of movable mirrors are disposed and driven about different rotation axes to control beams. For example, an optical switch for switching optical signals propagating through a plurality of optical fibers has an input beam direction module and an output beam direction module. The input beam direction module includes a first supporting member, a first collimator supported by the first supporting member for emitting a beam, a first substrate disposed opposite to the supporting member, a first micromirror disposed on the first substrate, a second substrate disposed opposite to the first substrate, and a second micromirror disposed on the second substrate. The output beam direction module receives light from the input beam direction module. The optical switch also has a mechanism for rotating the first micromirror in a first direction, and rotating the second micromirror in a second direction.

(2) The output beam direction module also has a configuration basically similar to the input beam direction module. For example, the input module and output module are disposed opposite to each other such that a signal from an arbitrary fiber of the input module can be connected to an arbitrary fiber of the output module. As an example, in aspect (1), output beam direction module includes a second supporting member, a second collimator supported by the second supporting member for receiving a beam, a third substrate disposed opposite to the second supporting member, a third micromirror disposed on the third substrate, a fourth substrate disposed opposite to the third substrate, and a fourth micromirror disposed on the fourth substrate.

(3) In regard to the aspect (1), (2), the first substrate comprises a first beam passing region, and the second substrate comprises a second beam passing region. A beam exiting from the first collimator passes through the first beam passing region, and is reflected by the second micromirror. The beam reflected by the second micromirror is reflected by the first micromirror. The beam reflected by the first micromirror passes through the beam passing region, and is led to the output beam direction module.

(4) In regard to the aspects (1)–(3), a beam emitted from the fiber collimator is incident-obliquely to the first mirror substrate and the second mirror substrate.

For example, the first supporting member is supported by the first substrate through a first connecting member, and the first substrate is supported by the second substrate through a second connecting member.

(5) In regard to the aspects (1)–(4), the input beam direction module includes a plurality of the collimators, wherein the collimators includes a first collimator having an angle to a main substrate of the first substrate, smaller than an angle of a second collimator to the main surface of the first substrate, positioned closer to the output beam direction module than the first collimator.

Alternatively, for example, in the input module, the angle of the first collimator to the main surface of the first substrate is changed such that a beam emitted from the input module is directed to the vicinity of the center of the third micromirror array region of the output module when the first micromirror and the second micromirror are not rotated, and in the output module, the angle of the second collimator to the main surface of the third substrate is changed such that a beam emitted from the output module is directed to the vicinity of the center of the first micromirror array region of the input module while the third micromirror and the fourth micromirror are not rotated.

Also, in the beam direction module in the aspects (1)–(4), the first movable mirror and second movable mirror are preferably formed such that their surfaces are substantially parallel with the surface of the first mirror substrate and the surface of the second mirror substrate, respectively. They may be in parallel within a range of accuracy error.

(6) In regard to the aspects (1)–(5), the first and second substrates are formed with throughholes each having a diameter which is larger on one main surface than on the other main surface.

For example, the first beam passing region or the second beam passing region includes an opening formed through the substrate, wherein the opening has a diameter on a surface on which the micromirror is disposed smaller than a diameter on the opposite surface to the surface on which the second micromirror is disposed. Specifically, the through hole is preferably tapered.

(7) In regard to the aspects (1)–(6), the optical switch further includes a large mirror. The large mirror is disposed on an optical path through which light travels to the output side after it exits from the input module.

For example, a beam exiting from the input beam direction module is reflected by the large mirror (reflective plate) and led to the output beam direction module.

Thus, the large mirror is preferably disposed on the optical path between the input module and the output module such that a beam is reflected by the large mirror, wherein a signal from an arbitrary fiber of the input module can be connected to an arbitrary fiber of the output module.

(8) In the aspects (1)–(7), the large mirror includes a concavely curved surface opposite to the input beam direction module.

By doing so, when a beam is emitted from the arbitrary collimator of the input module to the output module, the curved surface of the large mirror can be adjusted such that the beam is directed to the vicinity of the center of a mirror arrangement region of first movable mirrors in the output module when the corresponding first and second movable mirrors are not rotated.

As an example of the present invention, a beam direction module has a plurality of fibers for inputting and outputting optical signals and can transform an optical signal propagating through each fiber into a beam which is directed to an arbitrary direction. The beam direction module has fibers through which optical signals propagate, a fiber collimator array having a plurality of a fiber collimators each comprised of a fiber through which an optical signal propagate, and a collimator lens disposed to transform the optical signal from the fiber into a collimated beam, arranged on a fiber collimator supporter, and a first mirror array having a plurality of first movable arrays each having a single rotation axis and a controllable inclination angle, and a plurality of first windows through which beams can pass, arranged on a first thin mirror substrate, respectively, corresponding to the fiber collimators. The beam direction module further has a second mirror array having a plurality of second movable arrays each having a single rotation axis and a controllable inclination angle, and a plurality of second windows through which beams can pass, arranged on a second thin mirror substrate, respectively, corresponding to the fiber collimators. A beam emission surface of the fiber collimator array is disposed in close proximity to the first mirror array, and the first mirror array is disposed in close proximity to the second mirror array. The respective members are positioned such that a beam emitted from the fiber collimator passes through the first window, reflects on the second movable mirror, reflects on the first movable mirror, passes through the second window, and is emitted to the outside. A direction in which the beam is emitted can be controlled by adjusting inclination angles of the first movable mirror and second movable mirror.

One feature of the present invention lies in that two mirrors are controlled on a axis-by-axis basis to control the direction in which a beam is emitted.

This can reduce the size of a mirror device.

For an adjustment made by a combination of a fixed mirror and a biaxially movable mirror as in the prior art, the biaxially movable mirror generally requires a needle responsible for rotation about one axis in addition to an effective mirror surface which rotates about another axis. On the other hand, the uniaxially movable mirror does not require such a needle, so that the entire mirror device can be reduced in size. Also, with a generally employed electrostatically driven mirror, the biaxially movable mirror requires four or at least three electrodes, whereas the uniaxially movable mirror requires only two, thus allowing for a reduction in a space for routing wires for powering the electrodes. From the effects as described above, the present invention can improve a mirror packing density to provide an optical matrix switch which support a more increased number of channels.

Also, for the adjustment made by a combination of a fixed mirror and a biaxially movable mirror as in the prior art, the effective mirror surface of the biaxially movable mirror inclines following the rotation of the needle, resulting in a change, in accordance with the amount of rotation of the needle, in the characteristic of the relationship between a voltage value applied to a pad for rotating the mirror surface and the amount of rotation of the mirror surface, thereby making the beam direction control quite difficult.

On the other hand, in the present invention, since each of two independent mirrors are responsible for rotation about one axis, no interference occurs between the axes so that the beam direction control is facilitated.

Also, since the first mirror array and second mirror array arranged on thin substrates are positioned in close proximity to the beam emission surface of the fiber collimator array, a significant reduction can be made in a light path from a fiber to the first movable mirror and second movable mirror. Also, even if the array size is increased for supporting a larger number of channels, it is possible to limit an increase in the light path from the fiber to the mirror. For this reason, a reduction in the coupling efficiency can be limited with respect to an angular shift of the optical axis of the fiber collimator and mirror control. Also, with the close proximity arrangement, the fiber collimator array, first mirror array and second mirror array can be directly aligned to one another using grooves, pins and the like, without the need for an active alignment method, resulting in a reduction in efforts for the alignment. Furthermore, since the dimension accuracy of the grooves can be highly accurately controlled by a mask, a highly accurate alignment can be accomplished.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 16 is a cross-sectional view schematically illustrating the configuration of an optical switch according to one embodiment of the present invention.

DETAILED DESCRIPTION OF THE INVENTION

In the following, embodiments of the present invention will be described with reference to the accompanying drawings.

Figure 1:
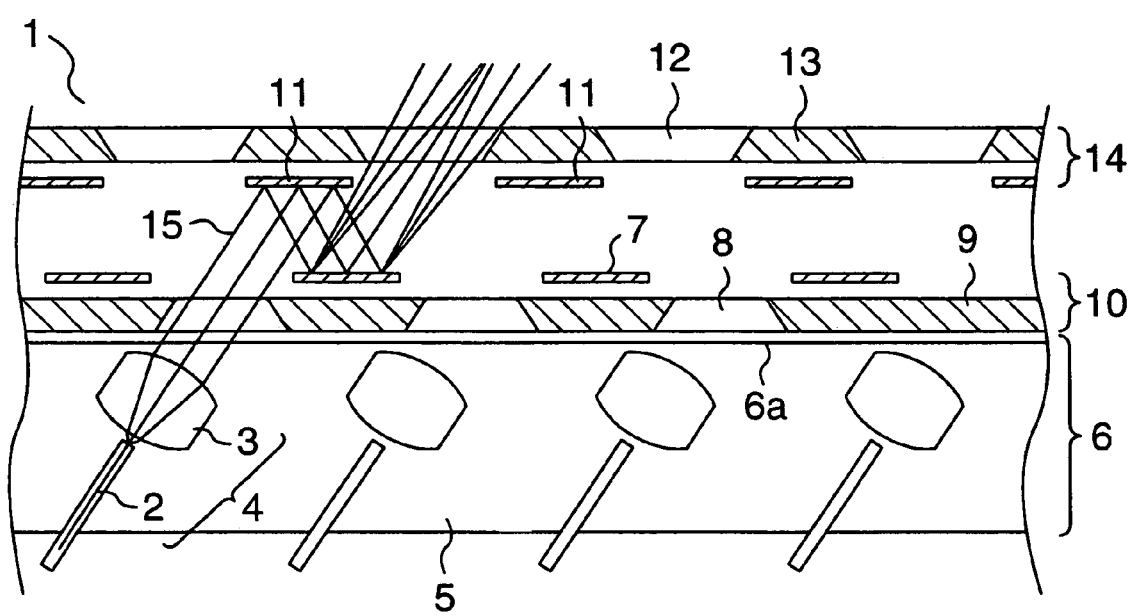
FIG. 1 is a cross-sectional view schematically illustrating the configuration of a beam direction module according to one embodiment of the present invention.

FIG. 1 illustrates in a cross-sectional view a beam direction module 1 according to a first embodiment of the present invention. The beam direction module 1 has a plurality of optical fibers for inputting and outputting optical signals, each of with transforms an optical signal propagating through each fiber into a beam which can be directed independently in an arbitrary direction. Each of fiber collimators 4 comprises a collimator lens 3 which is arranged to transform an optical signal propagating through a fiber 2 into a collimated beam. A fiber collimator array 6 comprises a plurality of the fiber collimators 4 arranged on a fiber collimator supporter 5. A first mirror array 10 comprises a plurality of first mirrors 7, each of which has a single rotation axis and a controllable inclination angle, and a plurality of first windows 8 through which beams can be passed. The first mirrors 7 and first windows 8 are arranged on a first thin mirror substrate 9 corresponding to the fiber collimators 4, respectively. A second mirror array 14 comprises a plurality of second mirrors 11, each of which has a single rotation axis orthogonal to the rotation axis of the first mirror 7 and a controllable inclination angle, and a plurality of second windows 12 through which beams can be passed. The second mirrors 11 and second windows 12 are arranged on a second thin mirror substrate 13 corresponding to the fiber collimators 4, respectively. The first mirror array 10 is positioned in close proximity to a beam emission surface 6a of the fiber collimator array 6, while the first mirror array 10 in close proximity to the second mirror array 14, such that a beam 15 emitted from the fiber collimator 4 passes through the first window 8, reflects on the second mirror 11, reflects on the first mirror 7, passes through the second window 12, and exits to the outside. The inclination angles of the first mirror 7 and second mirror 11 can be adjusted to control the direction in which the beam 15 is emitted.

Figure 2:
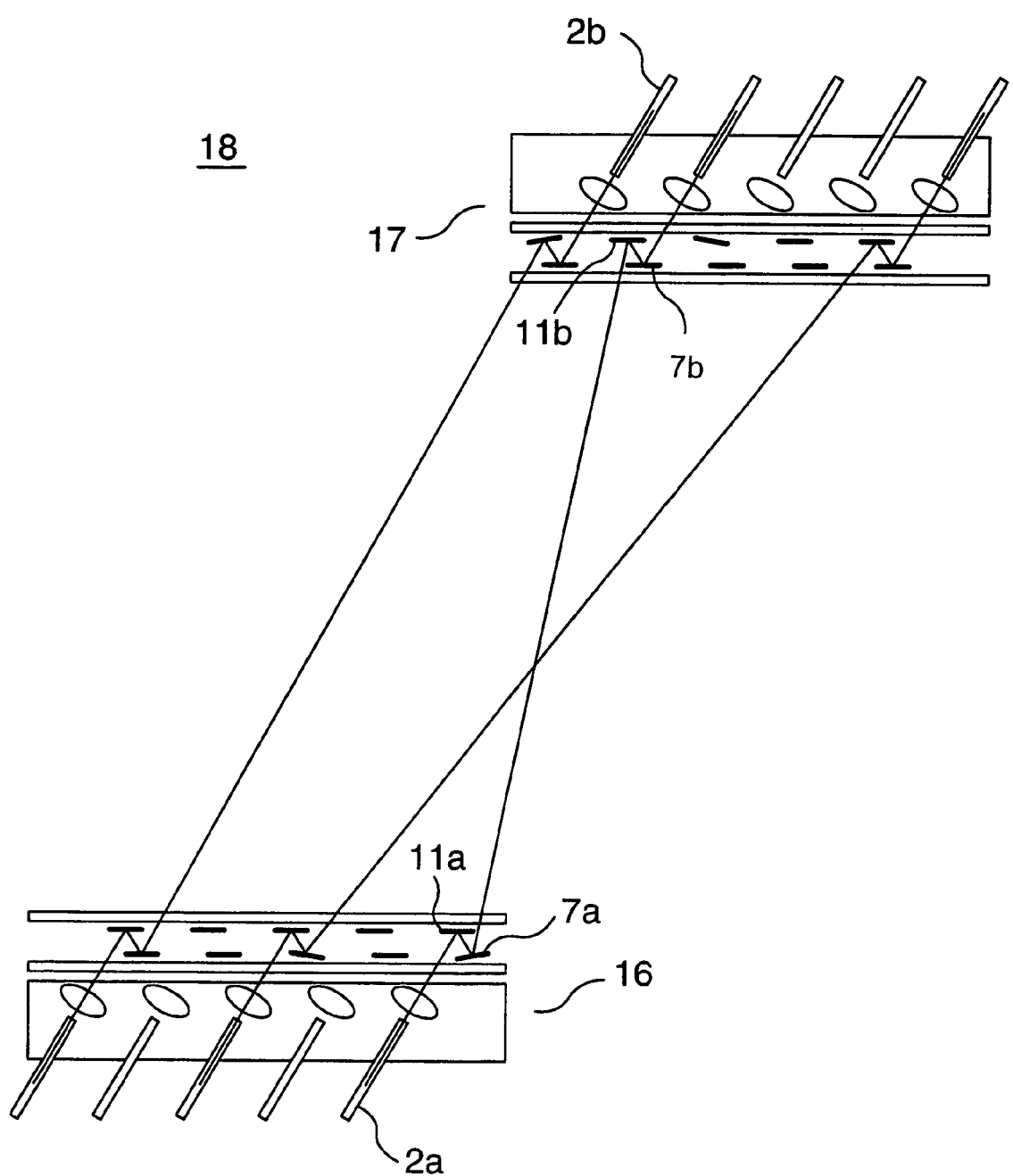
FIG. 2 is a cross-sectional view schematically illustrating the configuration of an optical switch according to one embodiment of the present invention.

As illustrated in a schematic cross-sectional view of FIG. 2, an optical switch 18 according to a second embodiment of the present invention comprises a pair of the beam direction modules 12 according to the first embodiment, arranged opposite to each other, one of which serves as an input module 16, and the other of which serves as an output module 17. An optical signal sent to a fiber 2a of the input module 16 is transformed into a beam, and is directed to an arbitrary first mirror 7b of the output module 17 by controlling a corresponding first mirror 7a and second mirror 11a. In the output module 17, the inclinations of a first mirror 7b and a second mirror 11b are controlled to converge the beam onto an end face of a corresponding fiber 2b. In this way, an optical signal sent to an arbitrary fiber 2b of the input module 16 can be connected to an arbitrary fiber 2b of the output module 17.

Figure 3:
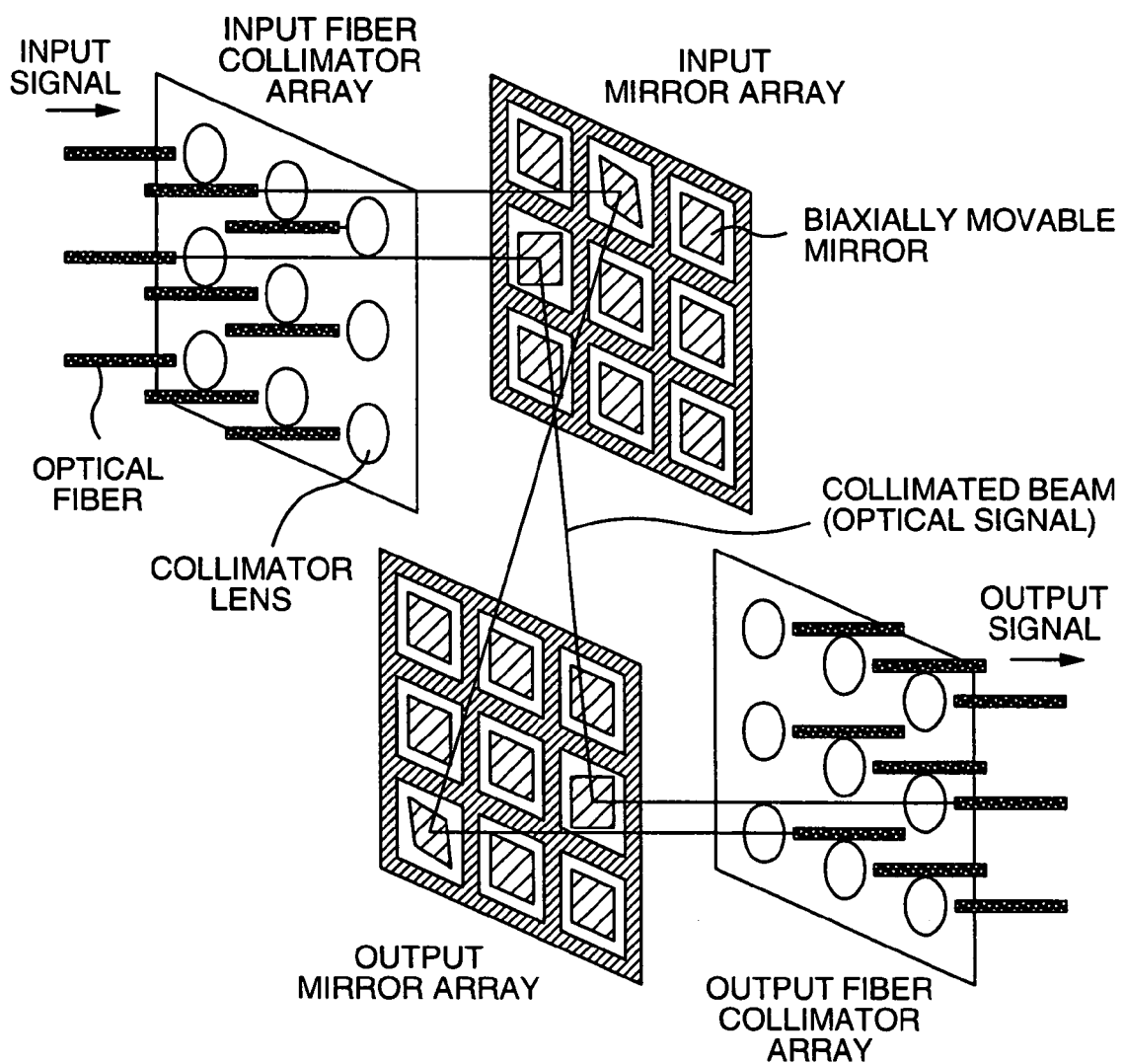
FIG. 3 is a perspective view generally illustrating the configuration of a three-dimensional optical switch of a comparative example.

FIG. 3 illustrates the basic configuration of a three-dimensional optical switch as a comparative example. The illustrated optical switch has two pairs of fiber collimator arrays, one on the input side and one on the output side, each of which has a-two-dimensional array of fiber collimators, each of which can transform light from a fiber end into a collimated beam for emission or can converge a collimated beam onto a fiber end. The optical switch also has a pair of mirror arrays, one on the input side and one on the output side, each of which has a two-dimensional array of movable micromirrors corresponding to respective fibers. Each of the micromirrors is biaxially movable, and has a controllable inclination angle. A beam from an arbitrary fiber collimator on the input side is reflected by a corresponding mirror on the mirror array on the input side, led by a mirror corresponding to a target output port in the mirror array on the output side, and led to a fiber collimator on the output side by this mirror, thus achieving optical coupling.

Figure 4:
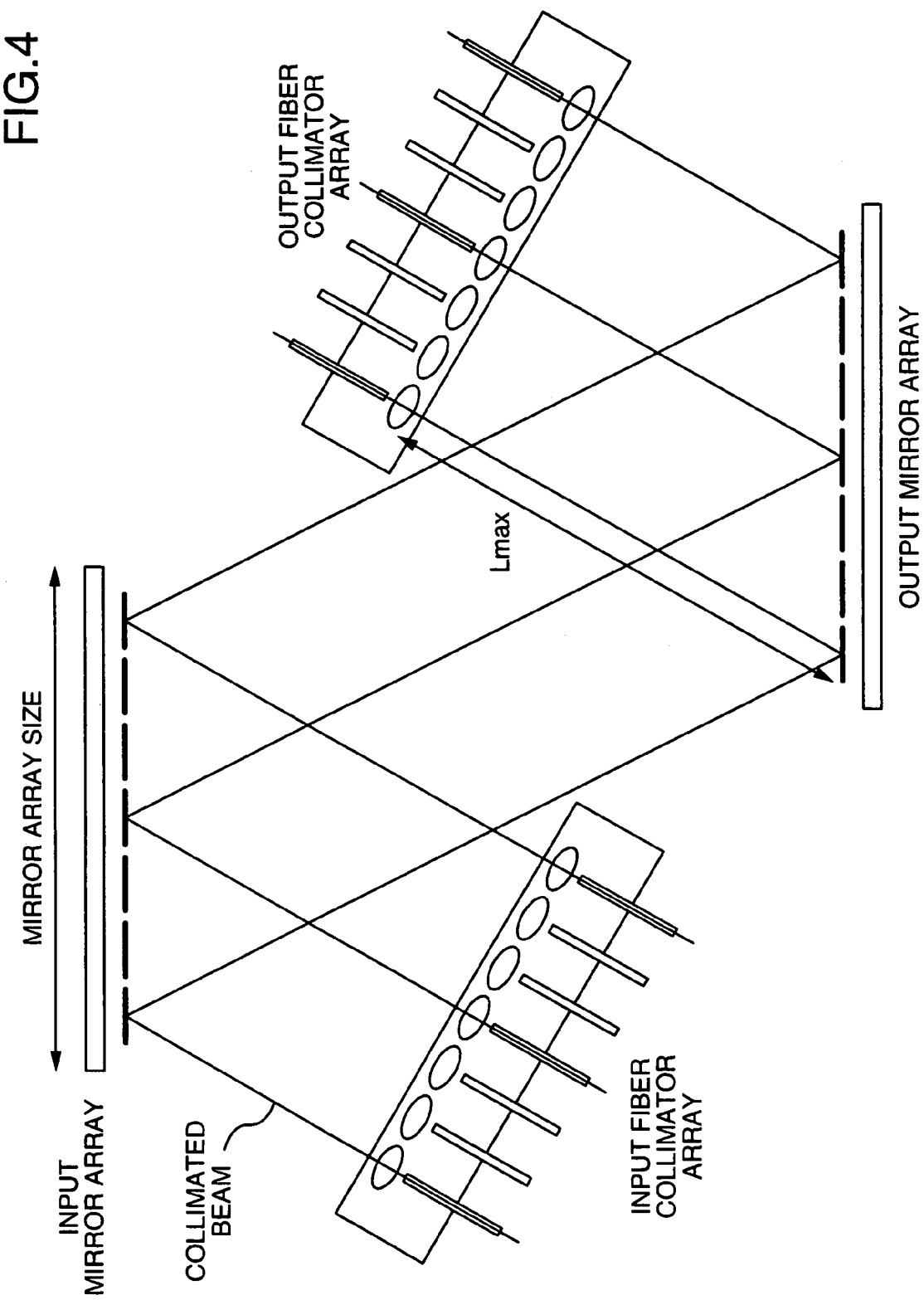
FIG. 4 is a cross-sectional view schematically illustrating the configuration of the three-dimensional optical switch of the comparative example in cross section.

FIG. 4 illustrates the arrangement of the input fiber collimator lenses, input biaxially movable mirrors, output biaxially movable mirrors, and output fiber lenses in one horizontal column of the three-dimensional optical matrix switch given as the comparative example. For achieving a high coupling efficiency, it is necessary to highly accurately control the relative position of the fiber collimator array to the mirror array, the mirrors, and the like to ensure that the energy of optical beams is coupled to the output fibers. For example, if each fiber collimator of the fiber collimator array varies in the angle in the direction of the optical axis, a beam will be misaligned to an associated mirror to cause a loss. Also, if a shift occurs in controlling the angle of an output mirror, a beam will be focused at a shifted point on an associated output fiber to cause a loss. The shift in the beam incident position becomes larger in proportion to the distance L between the collimator lens and mirror, so that a reduction in the distance L is critical in order to reduce the loss, i.e., improve the coupling efficiency.

In the optical matrix switch illustrated in FIG. 4 as a comparative example, however, since the fiber collimator arrays are positioned away from the associated mirror arrays in order to prevent the fiber collimator arrays from interfering with light paths, resulting in the distance L which is relatively large. Also, since the lenses and mirrors are arranged on surfaces not parallel with each other, the distance L varies depending on the location, possibly resulting in variations in the coupling efficiency. In addition, the distance L has a larger maximum value (Lmax) as the optical matrix switch has more channels and accordingly a larger mirror array.

In the optical switch according to one embodiment of the present invention, since the first mirror array 10 and second mirror array 14 are formed with windows through which beams can pass, it is not necessary to consider the interference of the fiber collimator array with beam light paths, as is the case in the comparative example of the three-dimensional optical switch illustrated in FIGS. 3 and 4. Thus, the first mirror array 10 and second mirror array 14 can be positioned in close proximity to the beam emission surface 6a of the fiber collimator array 6, thereby significantly reducing the light path from the collimator lens 3 to the first mirror 7 or second mirror 11. It is therefore possible to reduce the shift in the beam incident position to improve the coupling efficiency, as compared with the optical switch given as a comparative example. In addition, the light path length is consistent from any lens to an associated mirror, and the maximum light path length is not increased even if the optical switch is adapted for an increased number of channels, thereby making it possible to prevent variations and reduction in the coupling efficiency.

Figure 5:
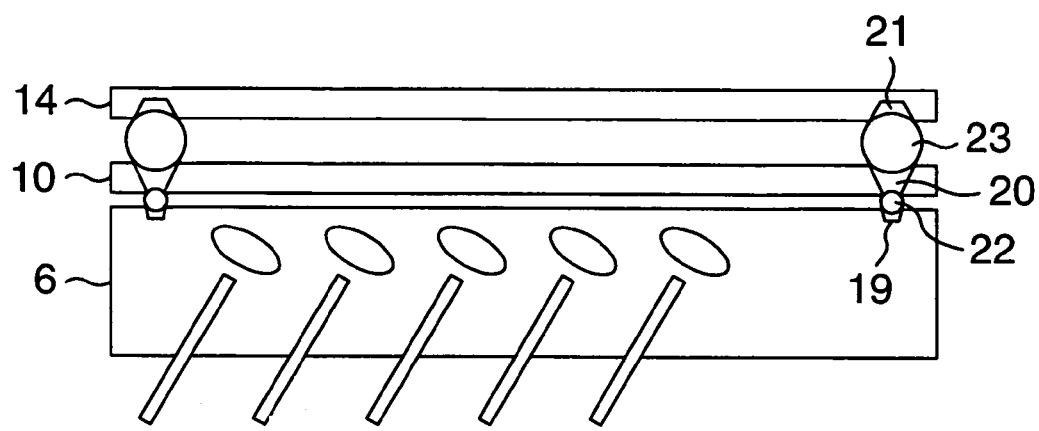
FIG. 5 is a schematic cross-sectional view for describing an exemplary method of assembling the beam direction module according to the present invention.

Furthermore, in the present invention, since the fiber collimator array 6, first mirror array 10 and second mirror array 14 are arranged in close proximity to one another, they can be directly aligned to one another. FIG. 5 is a cross-sectional view schematically illustrating an exemplary method of aligning the fiber collimator array 6, first mirror array 10 and second mirror array 14. The fiber collimator supporter 5, first mirror substrate 9 and second mirror substrate 13 are formed with a first groove 19, a second groove 20 and a third groove 21, respectively, for alignment at predetermined positions in peripheral regions. They are aligned to one another using a first pin 22 and a second pin 23 which have a guaranteed accuracy. The alignment grooves are preferably formed out of regions in which the mirrors or windows are arranged. The fiber collimator supporter 5, first mirror substrate 9 and second mirror substrate 13 are preferably aligned at at least two or more locations. Since the grooves can be formed with a high accuracy, for example, by etching or the like in accordance with a mask pattern, a sufficient alignment accuracy can be provided.

In the three-dimension optical switch given as a comparative example, since the fiber collimator array is positioned away from the associated mirror array, they must be aligned relative to each other, for example, by fixing the mirror array on a movable stage, adjusting the position of the mirror array on the stage while monitoring a reference beam exiting from the fiber collimator array. This alignment procedure also entails appropriate devices. In the present invention, on the contrary, since the fiber collimator array and mirror arrays can be directly aligned to one another with a high accuracy, it is possible to reduce efforts and cost required for the alignment. The grooves used for the alignment may be, for example, in a V-shape. Throughholes may be substituted for the grooves. The pins used in the alignment may be in the shape of a circular cylinder, a circular cylinder with a spherical leading end, or a sphere.

In a beam scanning module according to one embodiment of the present invention, a set of the fiber 2, collimator lens 3, first mirror 7, first window 8, second mirror 11 and second window 12 must be arranged to form a light path for one beam 15. These components may be arranged in various ways as long as the light path is formed. It should be noted however that when the first mirror 7 and second mirror 11 are formed not in parallel with the surfaces of the first mirror substrate 9 and second mirror substrate 13, respectively, such formation is difficult in view of manufacturing and involves much time and labor. In this regard, it is desirable to define the light path for the beam 15 using the first mirror 7 and second mirror 11 which are formed in parallel with the surfaces of the first mirror substrate 9 and second mirror substrate 11. Such a light path can be formed by positioning the fiber collimator 4 such that the beam 15 is incident obliquely on the first mirror substrate 9 and second mirror substrate 13.

Figure 6:
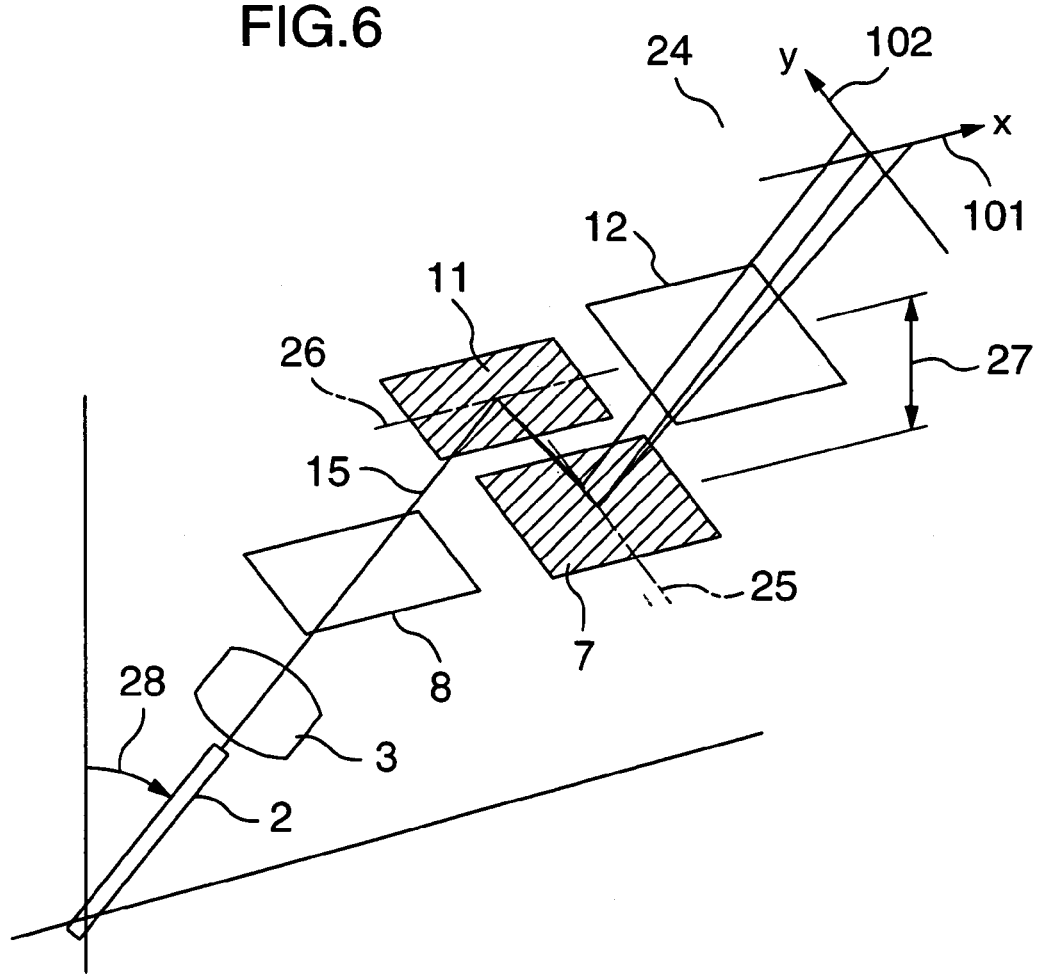
FIG. 6 is a perspective view for generally describing how a beam direction is controlled.

In one embodiment of the present invention, two mirrors having different rotation axes are mainly uniaxially driven to control a direction in which a beam is emitted. How to control the beam emission direction will be described with reference to FIG. 6. Consider an arbitrary beam projection surface 24 which is provided after a beam emitted from the collimator lens 3 passes through the first window 8, reflects on the second mirror 11 and first mirror 7, and passes through the second window 12. An x-direction 101 and a y-direction 102 are defined as shown in FIG. 6. The beam can be swung in the x-direction 101 on a beam projection plane 24 by rotating the first mirror 7 about a first mirror rotation axis 25, while the beam can be swung in the y-direction 102 on the beam projection plane 24 by rotating the second mirror 11 about a second mirror rotation axis 26. In this way, the beam can be directed in an arbitrary direction using two uniaxially driven mirrors having the rotation axes orthogonal to each other. Of course, the two mirrors may have the rotation axes in the opposite directions. Also, while the axes are most preferably orthogonal to each other, they may not be completely orthogonal.

Preferably, however, the first mirror 7 and second mirror 11 are arranged such that the first mirror rotation axis 25 is oriented in the y-direction 102 and the second mirror rotation axis 26 is oriented in the x-direction 101, as illustrated in FIG. 6. The second window 12 must have a size large enough to pass a beam therethrough even if it is deflected by the mirrors. As the second window 12 is further away from the associated mirrors, the beam is deflected by a larger distance at the second window 12. Therefore, when the beam is swung in the x-direction at the second mirror 11 which is more distanced to the second window 12 than to the first mirror 7, contrary to the configuration illustrated in FIG. 6, the second window 12 must be expanded in the x-direction. This leads to a requirement for larger pitches of the second mirrors 11 and second windows 12, and to a resulting increase in the mirror substrate gap 27. Consequently, the second window 12 is more distanced from the associated mirrors, so that the second mirror 12 must be further expanded, resulting in larger pitches at which the second mirrors 11 and second windows 12 are arranged. Conversely, when the beam is deflected by the second mirror 11 in the y-direction, the second window 12 is more expanded in the y-direction, which however does not affect the gap 27 between the mirror arrays. As will be understood from the foregoing, when the second mirrors 11 are arranged to deflect beams in the y-direction, i.e., orient their rotation axis in the x-direction as illustrated in FIG. 6, the resulting multi-channel optical switch has the mirrors and windows arranged at smaller pitches and accordingly has a higher packing density. The x-direction herein referred to is a fiber collimator inclination direction 28, in which a beam exits from the collimator 3, with respect to the direction in which the first mirror array 10 and second mirror array 14 are stacked. In other words, the second mirrors 11 are preferably arranged such that their second rotation axis 26 is oriented in the same direction in which the inclined beam exits from the collimator 3. Thus, the fiber collimator inclination direction 28 matches the x-direction 101.

Specifically, viewed from the direction in which the substrates, on which the mirrors are arranged, are stacked, the second mirror 11 has the rotation axis in a direction closer to a direction parallel with the longitudinal direction (or the direction in which the beam exists) of the optical fiber 2 (which can be the collimator 3) than a direction orthogonal to the longitudinal direction, while the first mirror 7 has the rotation axis in a direction closer to the orthogonal direction than the parallel direction. Thus, the second mirror rotation axis 26 is closer to the fiber collimator inclination direction 28, beam exiting direction, and the like than the first mirror rotation axis 25. Also, viewed from the same direction, the second mirror 11 is driven to change reflected light more in the direction orthogonal to the output than in the direction orthogonal to the direction in which the beam exits from the optical fiber 2 or collimator 3 than in the direction parallel with the same, while the first mirror 7 is driven to change reflected light more in the direction parallel with the beam exiting direction than in the direction orthogonal to the same.

Figure 7A:
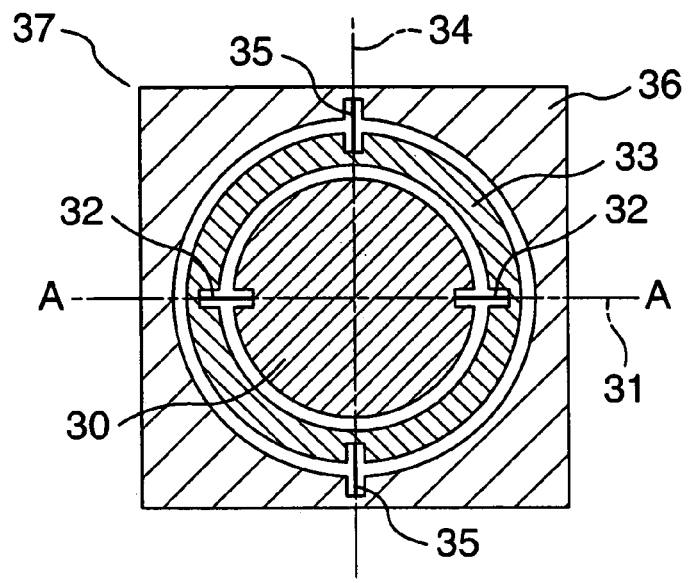
FIG. 7A is a plan view schematically illustrating the configuration of an electrostatically driven biaxially movable micromirror.
Figure 7B:
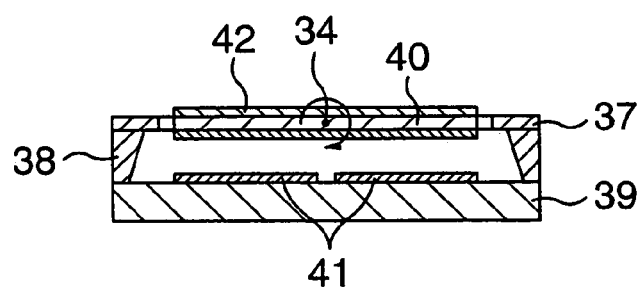
FIG. 7B is a cross-sectional view schematically illustrating the configuration of the electrostatically driven biaxially movable micromirror, and a driving method therefor.
Figure 7C:
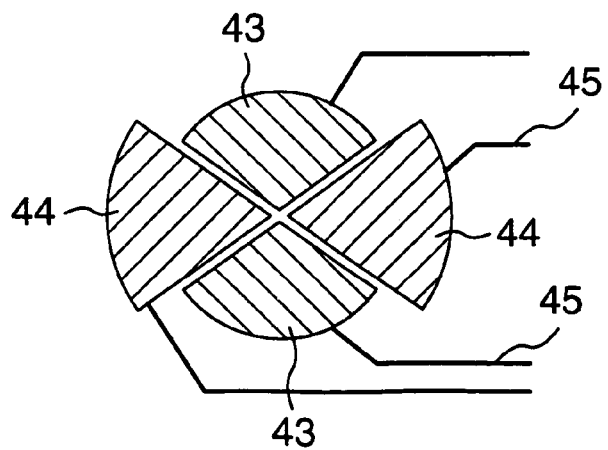
FIG. 7C is a plan view schematically illustrating the configuration of a electrode for driving the electrostatically driven micromirror.

The mirrors for use in the optical matrix switch can be manufactured using the MEMS (Micro electromechanical systems) technology, and electrostatically driven. FIGS. 7A to 7C illustrate an exemplary structure of a biaxially driven mirror. FIG. 7A illustrates the structure in plan view, where an effective mirror portion 30 which reflects a beam is coupled to a movable frame 33 through two first torsion bars 32 which make up a first rotation axis 31. The movable frame 33 is coupled to a support frame 36 through two second torsion bars 35 which form a second rotation axis 34 orthogonal to the first rotation axis 31 to constitute a mirror assembly 37. The movable frame 33 is rotated together with the effective mirror portion 30 about the second rotation axis 34, and the effective mirror portion 30 is rotated about the first rotation axis 31, thereby permitting the effective mirror portion 30 to biaxially rotate.

FIG. 7B is a cross-sectional view taken along a line A—A in FIG. 7A for showing a mirror driving method. The mirror assembly 37 is disposed on an electrode substrate 39 through a spacer 38. A conductive film 40 is formed on a surface of the mirror assembly 37 opposite to the electrode substrate 39. A voltage is applied to an electrode 41 formed on the surface of the electrode substrate 39 to generate an electrostatic attractive force between the electrode 41 and conductive film 40 which attracts the effective mirror portion 30 and movable frame 33 for rotation. A mirror film 42 capable of reflecting a beam is formed at least on the surface of the effective mirror portion 30 on the surface of the mirror assembly 37 opposite to the surface on which the conductive film 40 is formed.

FIG. 7C illustrates an exemplary two-dimensional arrangement of the electrode 41. The electrode 41 comprises a pair of electrodes 43 for mainly generating rotation about the first mirror rotation axis 31, and a pair of second electrodes 44 for mainly generating rotation about the second mirror rotation axis 34. A total of four electrodes are provided, so that four wires 45 are formed on the electrode substrate 39 for powering the electrodes 43, 44.

Figure 8A:
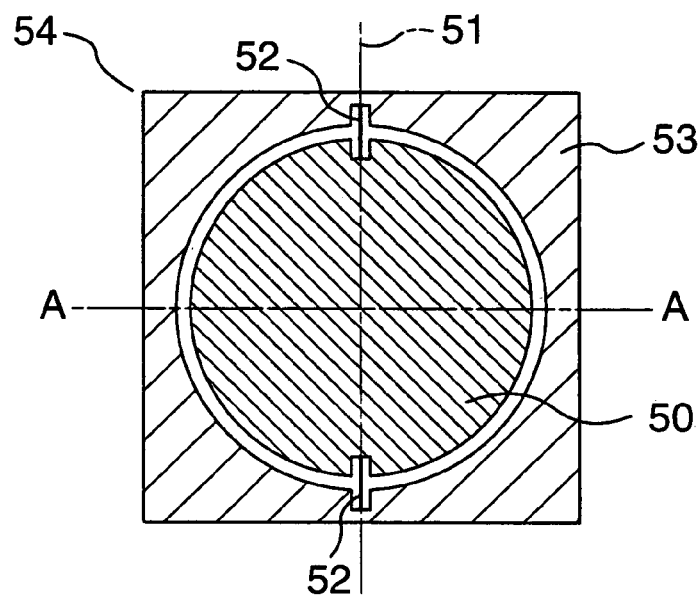
FIG. 8A is a plan view schematically illustrating the configuration of an electrostatically driven uniaxially movable micromirror.
Figure 8B:
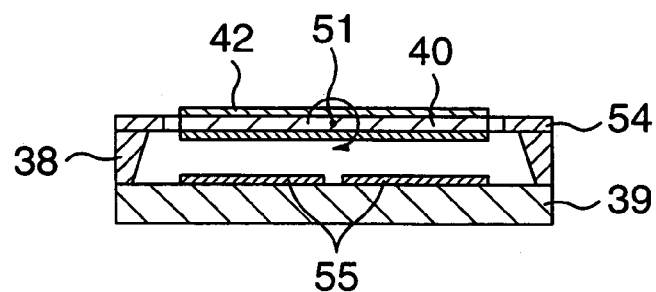
FIG. 8B is a cross-sectional view schematically illustrating the configuration of the electrostatically driven uniaxially movable micromirror, and a driving method therefor.
Figure 8C:
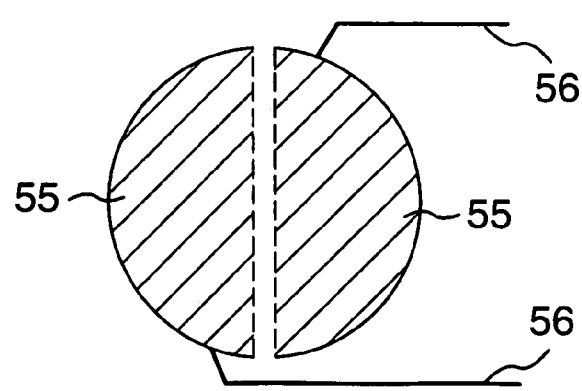
FIG. 8C is a plan view schematically illustrating the configuration of an electrode for driving the electrostatically driven uniaxially movable micromirror.

FIGS. 8A to 8C in turn illustrate an exemplary structure of a uniaxially movable mirror. As illustrated in FIG. 8A, an effective mirror portion 50 is coupled to a support frame 53 through a pair of torsion bars 52 which make up a rotation axis 51 to constitute a mirror assembly 54. The effective mirror portion 50 is rotated only about the rotation axis 51 without the need for a needle as required by a biaxially movable mirror. As illustrated in FIG. 8C, only a pair of electrodes 55 are provided for generating rotation about the rotation axis 51, so that two wires 56 are required for connection to the electrodes 55.

Thus, the uniaxially movable mirror can result in a smaller mirror assembly than a biaxially movable mirror because the former does not need a needle. In addition, since the uniaxially movable mirror requires only two wires which is one half of four wires required by the biaxially movable mirror, a wire routing space is also reduced to substantially one half of that required by the biaxially movable mirror. While the mirror assemblies, windows, electrodes and wires must be disposed respectively on the first mirror substrate 9 and second mirror substrate 13 of the present invention, the mirror device itself is reduced in size by the use of the uniaxially movable mirror, as compared with a counterpart using a biaxially movable mirror. Also, a reduced wiring space permits the mirrors to be arranged at a smaller pitch, thereby improving the packing density. In this way, it is possible to compensate for a reduced mirror packing density due to the windows disposed for passing beams therethrough, and accordingly provide an optical switch adapted for a more increased number of channels.

Figure 9:
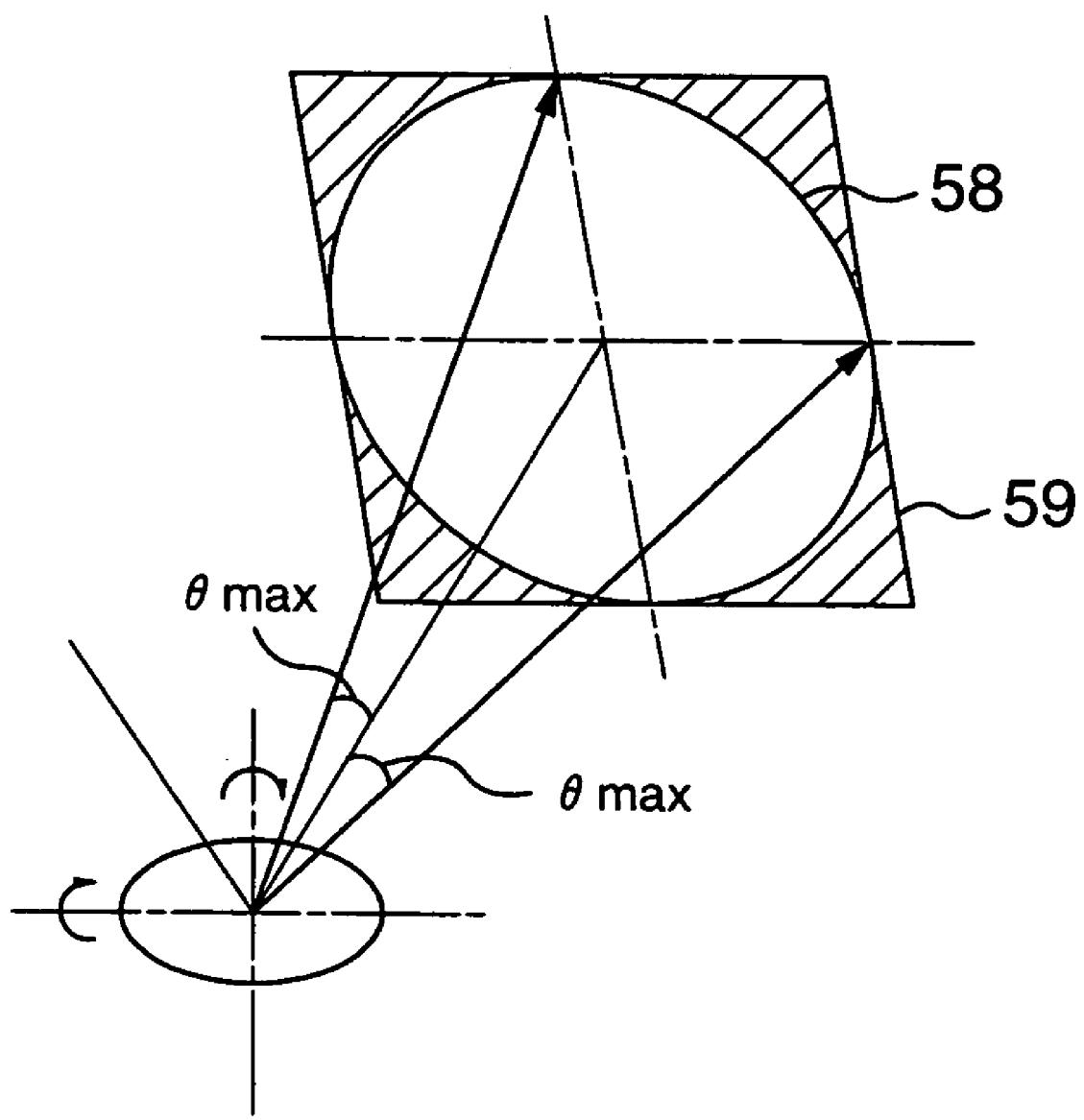
FIG. 9 is a schematic diagram for comparing beam deflect angle ranges between the biaxially movable mirror and the uniaxially movable mirror.

FIG. 9 is a schematic diagram showing ranges to which a beam can be accessed on the output mirror array (called the "beam accessible range") of a general biaxially movable mirror and uniaxially movable mirror as illustrated in FIGS. 7 and 8, respectively, by deflecting a mirror on the input mirror array over an angular distance. A maximally deflectable angle of the mirror is determined by an angle at which a pull-in phenomenon occurs. In the pull-in phenomenon, the mirror is inclined closer to the electrode to suddenly increase an electrostatic force which loses the balance with the rigidity of the torsion beam, causing the mirror to be completely attracted to the electrode. Assuming that a mirror can rotate to a maximum angle θmax without pull-in, the biaxially movable mirror has a deflectable angle limit θmax at which the mirror approaches closest to the electrode, so that the beam accessible range 58 is substantially circular, as illustrated in FIG. 9. On the other hand, in the optical switch of the present invention which uses two uniaxially movable mirrors for controlling the direction of a beam, the mirror can be rotated over θmax respectively in two orthogonal axial directions, so that the beam accessible range 59 is rectangular as illustrated in FIG. 9, wherein the mirror can be expended even to a portion indicated by hatchings.

Further, when the uniaxially movable mirror and biaxially movable mirror have the size of the effective mirror portion, the uniaxially movable mirror can have a larger area of electrode which can generate a larger electrostatic attractive force from an applied voltage value. Consequently, since the mirror assembly can be separated from the electrode by a larger distance while ensuring a sufficient driving force, the pull-in is less likely to occur, and the maximum deflectable angle of the mirror can be increased.

From these effects, it is possible to compensate for a lower mirror packing density due to the windows disposed for passing beams therethrough, and accordingly provide an optical switch adapted for a more increased number of channels.

In the biaxially movable mirror, for example, when the needle is rotated about the second mirror rotation axis, the effective mirror also rotates simultaneously. This causes a change in a gap between the effective mirror and first electrode, resulting in a change in the characteristic of the relationship between the rotation of the effective mirror about the first rotation axis and a voltage applied to the first electrode. In this way, the mirror rotation angle is very difficult to control because the characteristic of rotation about one axis changes depending on the amount of rotation about the other axis.

However, in the configuration of the present invention which uses two uniaxially movable mirrors, the rotations about two axes are served by the two uniaxially movable mirrors independently of each other, resulting in elimination of interference between the axes, the consistent characteristic of the relationship between the rotation of the mirror and the voltage applied to the electrode, and facilitated control for the mirror rotation angle.

A method of creating a plurality of first mirrors 7 or second mirrors 11 arranged on the first mirror array 10 or second mirror array 14 involves creating a wafer having a plurality of the mirror assemblies 54 as illustrated in FIG. 8 arranged thereon using the MEMS technology, and adhering the wafer through a spacer to the first mirror substrate 9 or second mirror substrate 13 formed with electrodes and wires.

The MEMS technology refers to the technology which employs a wafer made of silicon or silicon oxide, patterns a mask by photolithography, and creates a three-dimensional structure using a processing method such as wet etching, dry etching or the like. The first mirror 7 and second mirror 11 are not limited to the configuration illustrated in FIG. 8, and may take a variety of configurations such as the shape of the effective mirror portions and beams, the shape and arrangement of the electrodes, and the like. For example, the effective mirror portions may be rectangular, as illustrated in FIG. 6. Preferably, the mirror packing density is made higher by using mirrors which have a smallest possible area other than the effective mirror portion.

The first window 8 and second window 12 are preferably created by forming throughholes extending through the first mirror substrate 9 and second mirror substrate 13, respectively. With the throughholes, beams can pass the substrates without loss. Materials for the first mirror substrate 9 and second mirror substrate 13 may be, for example, silicon, glass, or a metal material such as 42-alloy or the like. The formation of the throughholes can be carried out using a variety of processing methods depending on the material such as dry etching, wet etching, drill-based mechanical processing, laser processing, and the like.

Though the first window 8 and second window 12 may be perpendicular throughholes, they are preferably tapered throughholes as illustrated in FIG. 3. The mirror packing density can be increased by making opening areas of the throughholes of the first mirror substrate 9 and second mirror substrate 13 on the side on which the mirrors are arranged smaller than the back side, and limiting the opening areas to minimally required areas. Such tapered throughholes can be processed by anisotropically etching the substrates made, for example, of silicon.

Alternatively, when the first mirror substrate 9 and second mirror substrate 13 are made of glass, beams can transmit the glass, in which case no throughholes may be formed in the portions of the first windows 8 and second window 12. When the substrates are made of silicon, no throughholes may be formed as well if the wavelength of used beams is limited to a wavelength region in which the beams transmit the silicon substrates. In these cases, the effort for processing the throughholes can be saved, however, the coupling efficiency is reduced as compared with the throughholes due to a loss caused by reflections on the surfaces and due to a transmission loss. In this case, an anti-reflection film is preferably formed on the surface of the window portions.

The first window 8 and second window 12 can function as optical diaphragms by performing surface processing in peripheral portions of the windows on the substrates so as not to transmit beams. The diaphragms can reduce crosstalk, i.e., reflected light and scattered light of signals other than target beams coupled to fibers.

Figure 10A:
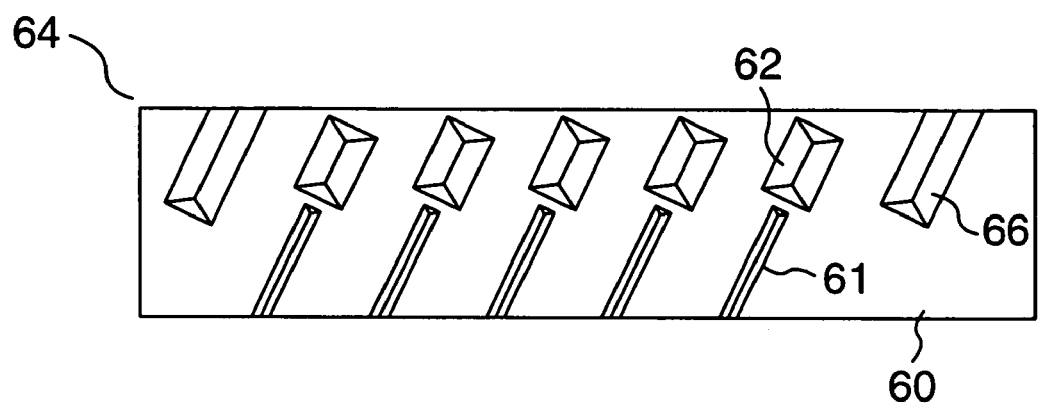
FIG. 10A is a plan view schematically illustrating the configuration of an exemplary supporting substrate on which fiber collimators are arranged.
Figure 10B:
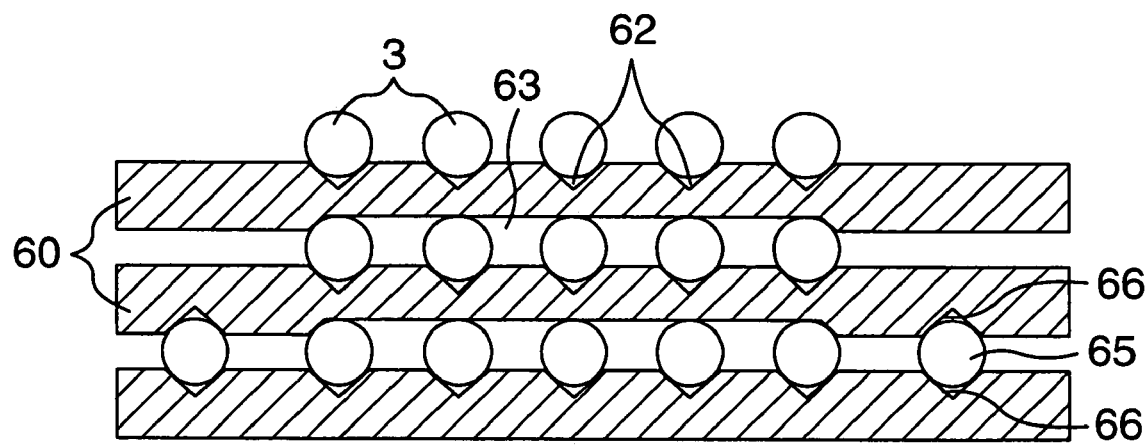
FIG. 10B is a cross-sectional view schematically illustrating an exemplary method of constructing a fiber collimator array.

The fiber collimator array 6 can be configured, for example, as illustrated in FIGS. 10A, 10B. As can be seen in a plan view of FIG. 10A, a plurality of fiber alignment grooves 61 for aligning fibers, and a plurality of first lens alignment grooves 62 for aligning collimator lenses are formed on a fiber collimator supporting substrate 60. A column of fiber collimators can be arranged by disposing cylindrical fibers 2 and cylindrical or spherical collimator lenses 4 in the respective grooves.

By stacking the fiber collimator columns as illustrated in a cross-sectional view of FIG. 10B (which shows only three lower stages, and the rest is omitted), a resulting fiber collimator array 64 has the fiber collimators arranged in a two-dimensional layout. The fiber collimator supporting substrates other than the lowermost layer are previously formed with second lens alignment grooves 63 on the backs to make alignment in the stack direction and plane direction through the lenses.

The following shows an exemplary alignment method for alignment to the first mirror array 10 using alignment pins 65 disposed on the lowermost layer in the cross-sectional view of FIG. 10B. The alignment pins 65 are disposed such that they project from the lens arrangement surface by the same length at four points on the outer periphery of the lens arrangement surface of the fiber collimator array 64 using alignment pin registration grooves 66 as illustrated in FIG. 10A. The first mirror array 10 is previously formed with an alignment groove in a surface opposing the fiber collimator array of the first mirror substrate 9, and the leading end of the alignment pin 65 is aligned with this groove to align the fiber collimator array 64 to the first mirror array 10. In this event, the alignment is facilitated by the groove made in a quadrangular pyramid shape in the first mirror array 10 and the leading end of the alignment pin 65 made in a spherical shape.

The fiber collimator supporting substrate can be formed with a highly accurate V-shaped groove by machining the substrate made, for example, of a silicon wafer, by anisotropic etching. However, the material and processing method are not limited to the particular material and machining process. Preferably, the groove is formed along a crystal plane. The foregoing configuration of the fiber collimator array is a mere example, and the arrangement, shape and the like of the grooves, pins and the like are not limited to the example. Alternatively, the beam direction mode may use an integrated fiber collimator having a lens fused with a fiber, in which case lens portions may only be aligned with grooves.

Figure 11:
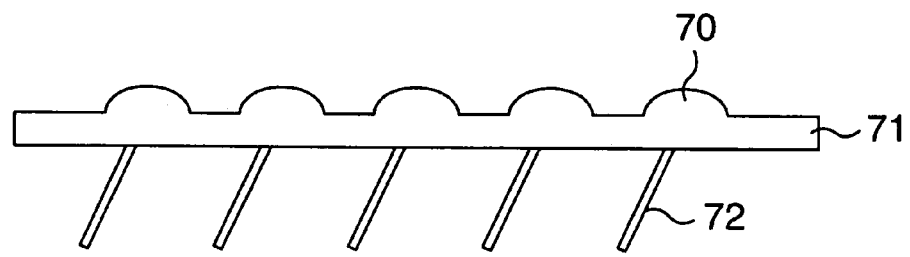
FIG. 11 is a cross-sectional view schematically illustrating an exemplary method of constructing a fiber collimator array.

Also, not limited to the structure of stacked fiber collimator supporting substrates, the beam direction module may take a configuration, for example, as illustrated in FIG. 11.

Using a collimator lens array 71 integrated with a plurality of two-dimensionally arranged collimator lenses 70, fibers 72 are connected at positions corresponding to the collimator lenses 70 on the back of the surface of the collimator lens array 71 on which the collimator lenses 70 are formed. The fiber collimator array 71 can be processed, for example, by precutting from a glass plate, casting a melted glass into a die, or the like. Also, in this case, an alignment groove is formed on the outer periphery of the surface of the collimator lens array 71 on which the collimator lenses 70 are formed for alignment to the groove formed in the first mirror array 10 using a pin or a ball.

The optical switch based on the beam direction modules of the present invention so far described can take various arrangements other than the second embodiment illustrated in FIG. 2.

Figure 12:
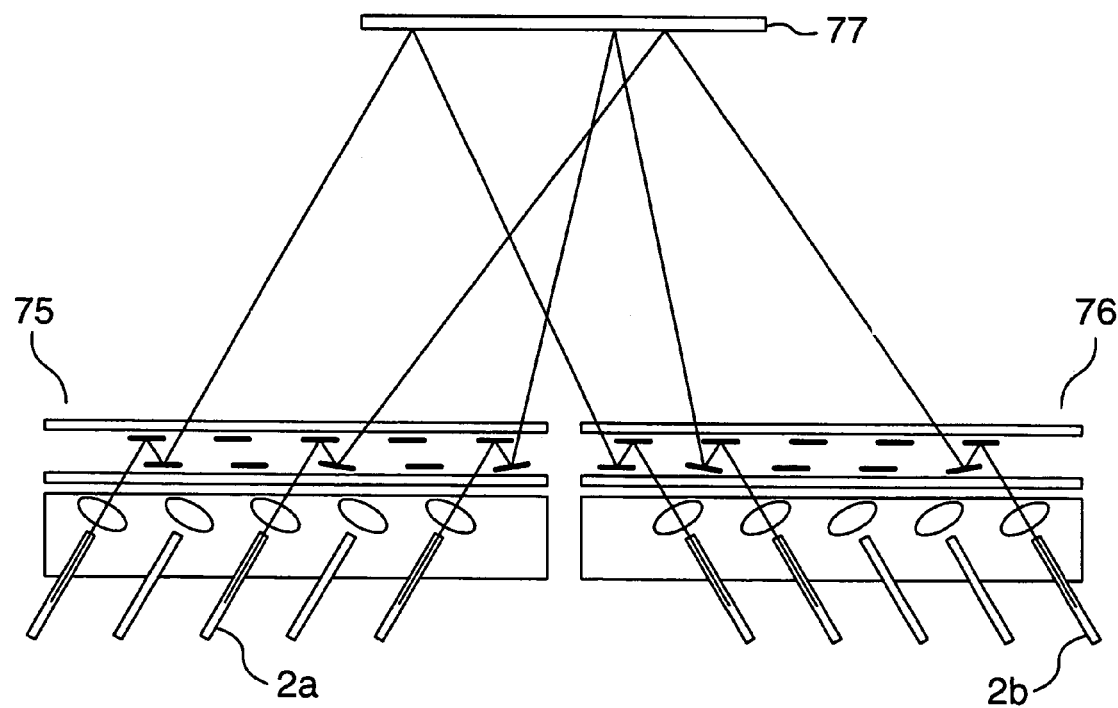
FIG. 12 is a cross-sectional view schematically illustrating the configuration of an optical switch according to one embodiment of the present invention.

FIG. 12 is a cross-sectional view schematically illustrating a third embodiment of the present invention. An input module 75 and an output module 76 are symmetrically disposed, and a large mirror 77 is disposed opposite to both modules. An optical signal through an arbitrary fiber 2a of the input module 75 is transformed into a beam which is emitted, reflected by the large mirror 77, and connected to an arbitrary fiber 2b of the output module 76. Here, the large mirror 77 reflects beams exiting from at least a plurality of collimator lenses. Preferably, the large mirror 77 can reflect beams exiting from all ports. Also, the large mirror 77 is preferably comprised of a fixed mirror having a size sufficiently larger than the micromirrors which make up the mirror array. Preferably, the large mirror 77 is comprised of a single mirror in view of the efficiency. In this embodiment, the input fibers can be extended in the same direction as the output fibers, and light paths are folded, so that the optical switch can save the space as a whole.

Figure 13:
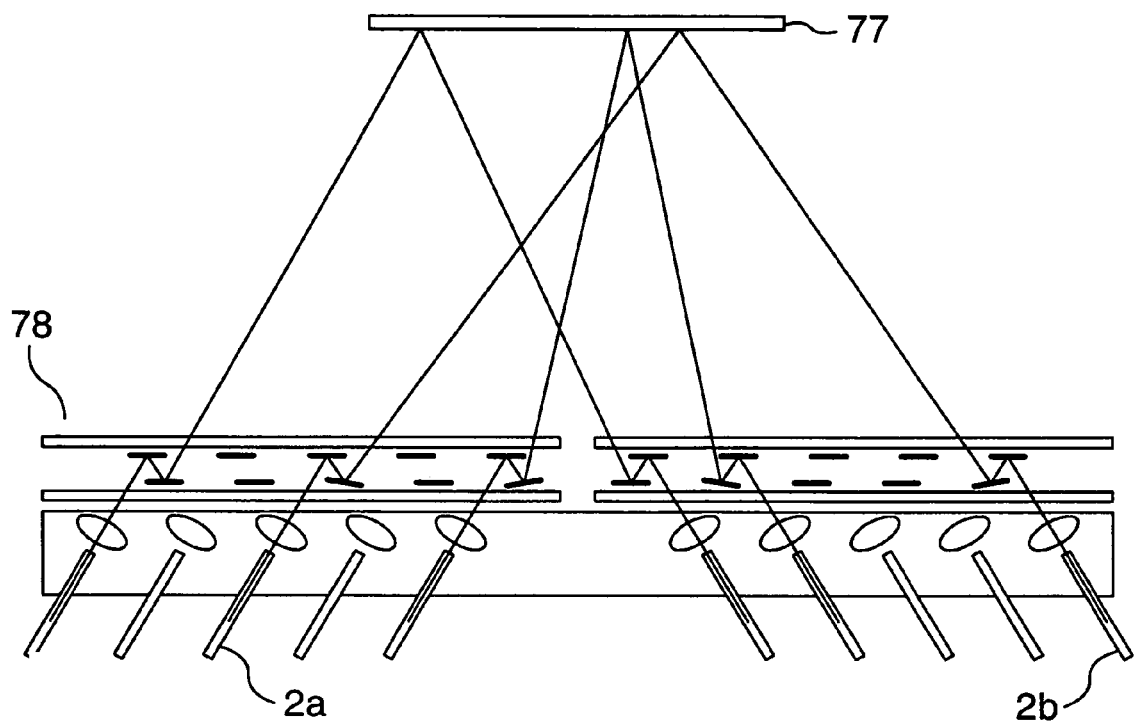
FIG. 13 is a cross-sectional view schematically illustrating the configuration of an optical switch according to one embodiment of the present invention.

As a form developed from the third embodiment, a fourth embodiment of the present invention is schematically illustrated in a cross-sectional view of FIG. 13. Portions corresponding to the input side and output side in the third embodiment are formed into a single beam direction module 78. In addition to similar effects to the third embodiment, the manufacturing cost and assembling cost can be reduced because a single beam direction module is only required.

Figure 14:
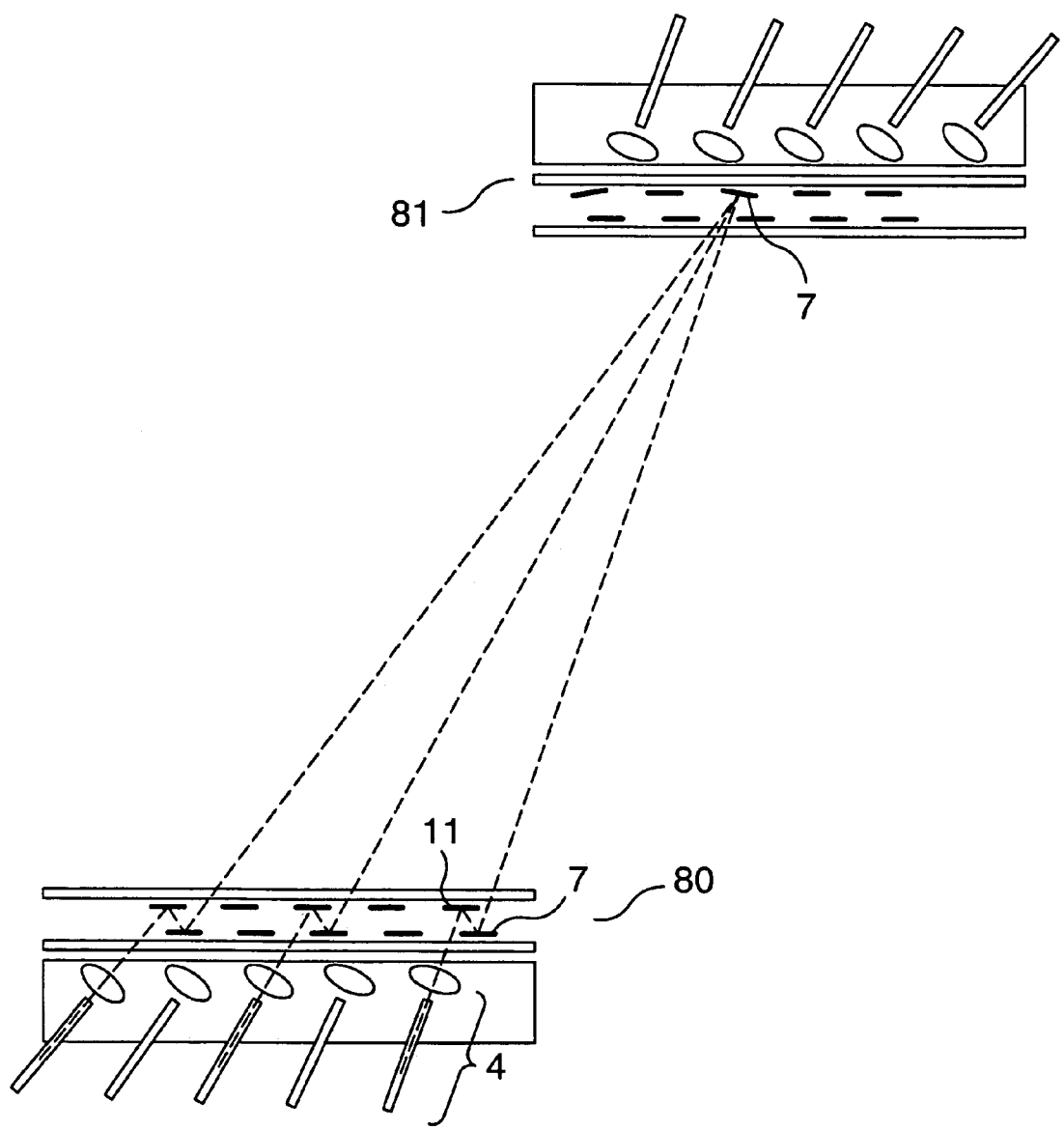
FIG. 14 is a cross-sectional view schematically illustrating the configuration of an optical switch according to one embodiment of the present invention.

FIG. 14 illustrates an optical switch according to a fifth embodiment of the present invention which comprises an input module 80 and an output module 81. The inclination of each fiber collimator 4 is changed such that a beam from each fiber collimator 4 is directed to the vicinity of the center of a mirror arrangement region of a first mirror array 7 in the opposing module. The fiber collimators 4 are arranged on a collimator array 6. If first mirrors 7 and second mirrors 11 are disposed such that beams are directed to outer peripheral portions of opposing mirror arrays when the mirrors are not given a driving force (for example, an electrostatic force or an electromagnetic force) (hereinafter called the "neutral state"), a maximally deflectable angle required to deflect beams within the opposing mirror arrangement region is offset to one side with respect to the neutral state. In a normal mirror device, the maximally deflectable angle is substantially equal on both sides of the neutral state, so that the maximally deflectable angle required for the mirrors is determined by the more largely swung side. In the fifth embodiment of the present invention, all beams are directed to the center of the opposing mirror array in the neutral state, and the respective mirrors can substantially uniformly use the mirror deflectable angle on both sides, so that the maximally deflectable angle required to the mirrors can be reduced. Stated in a different manner, the interval of modules can be narrowed to reduce light path lengths if the maximally deflectable angle is fixed.

When using the method of configuring the fiber collimator array illustrated in FIGS. 10A, 10B, this can be supported by changing the shape and arrangement of the first lens alignment groove 62 and second lens alignment groove 63. If the fiber collimators are directed to the center with difficulties in the direction in which fiber collimator supporting substrates are stacked, the foregoing effects can be still produced for one set of uniaxially movable mirrors by implementing only in the plane direction. Also, when using the method of configuring the fiber collimator array illustrated in FIG. 11, this can be implemented by changing a direction in which the fibers are connected to the collimator lens array.

Figure 15:
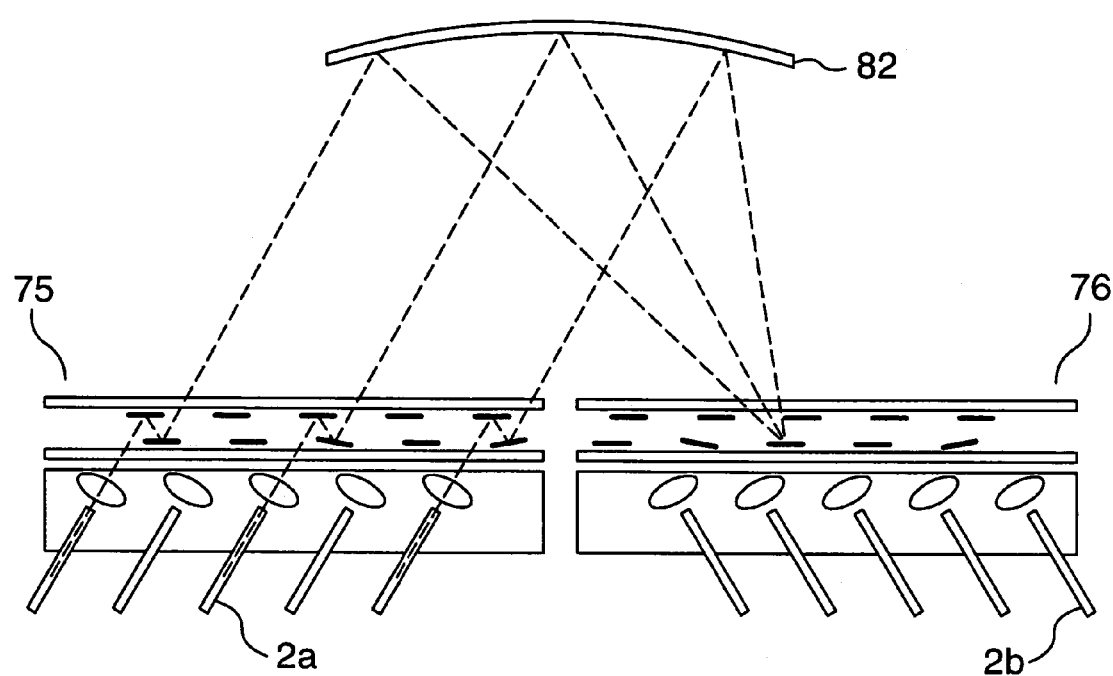
FIG. 15 is a cross-sectional view schematically illustrating the configuration of an optical switch according to one embodiment of the present invention.

In a sixth embodiment illustrated in FIG. 15, by using a large mirror 82 having a curved shape in a similar configuration to the third embodiment, an arbitrary beam can be directed to the vicinity of the center of the mirror array of an opposing module in the neutral state, thereby producing similar effects to the fifth embodiment.

In the configuration such as the three-dimensional optical switch given as a comparative example illustrated in FIGS. 3, 4, the beam direction module of the present invention may be used in the fiber collimator array. As illustrated in FIG. 16, an input beam direction module 90 and an output beam direction module 91 are disposed, and a first external mirror array 92 on the input side and a second external mirror array 93 on the output side are disposed between the modules 90, 91. A number of micromirrors 94 as much as the number of ports of the optical switch are disposed respectively on the first external mirror array 92 and second external mirror array 93. The micromirrors 94 are preferably biaxially movable. In this configuration, a beam deflectable range is extended because a mirror deflectable angle of the external mirror arrays can be used in addition to the deflectable angle of the movable mirrors included in the beam direction modules, so that a large scaled optical switch having, for example, about 1,000 channels is advantageously implemented. Also, in this event, by using the beam direction module of the present invention instead of the fiber collimators which only emit beams, the beam emission direction can be controlled by the mirrors contained in the beam direction modules to point the beams to target mirrors on the external mirror arrays without fail, thereby facilitating the mounting and assembly because a high accuracy is not needed in the relative positioning of the beam direction modules to the external mirror arrays.

The beam direction module of the present invention alone can be used as an optical beam scanner. In particular, the beam direction module can be applied, for example, to a laser beam printer, an optical scanner for reading a bar code and the like, a scan type projector, and so on. These applications involve an operation, for example, for linearly scanning a beam. If a biaxially movable mirror is used in such applications, the inter-axial interference makes the control quite difficult. Specifically, if the beam is linearly scanned along rotation about one axis, an applied voltage value for providing rotation about the other axis must be also changed in sequence. On the other hand, by using the configuration of the beam direction module used in any embodiment of the present invention, linear scanning can be readily accomplished at a desired position. For example, two uniaxially movable mirrors are used and controlled such that one mirror is fixed at a predetermined angle while the other mirror alone is moved.

The present invention can provide a three-dimensional optical switch with an increased mirror packing density which is suitable for multiple channels.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical switch for switching optical signals propagating through a plurality of optical fibers, comprising:
   an input beam direction module including:
   a first supporting member;
   a first collimator supported by said first supporting member for emitting a beam;
   a first substrate disposed adjacent to said supporting member;
   a first micromirror disposed on said first substrate;
   a second substrate disposed opposite to said first substrate; and
   a second micromirror disposed on said second substrate;
   an output beam direction module for receiving a beam from said input beam direction module; and including:
   a second supporting member; a second collimator supported by said second supporting member for receiving a beam; and a third substrate disposed opposite to said second supporting member; and
   a mechanism for rotating said first micromirror in a first direction, and rotating said second micromirror in a second direction.

2. An optical switch according to claim 1, wherein said output beam direction module includes:
   a third micromirror disposed on said third substrate;
   a fourth substrate disposed opposite to said third substrate; and
   a fourth micromirror disposed on said fourth substrate.

3. An optical switch according to claim 1, wherein;
   said first substrate comprises a first beam passing region;
   said second substrate comprises a second beam passing region;
   a beam exiting from said first collimator passes through said first beam passing region, and is reflected by said second micromirror;
   said beam reflected by said second micromirror is reflected by said first micromirror;
   said beam reflected by said first micromirror passes through said second beam passing region, and is led to said output beam direction module.

4. An optical switch according to claim 1, wherein said first supporting member is supported by said first substrate through a first connecting member, and said first substrate is supported by said second substrate through a second connecting member.

5. An optical switch according to claim 1, wherein said input beam direction module includes a plurality of said collimators, said collimators including a first collimator having an angle to a main substrate of said first substrate, said angle being smaller than an angle of a second collimator to the main surface of said first substrate, said second collimator being positioned closer to said output beam direction module than said first collimator.

6. An optical switch according to claim 3, wherein said first beam passing region or said second beam passing region includes an opening formed through said substrate, said opening having a diameter on a surface on which said micromirror is disposed smaller than a diameter on the opposite surface to said surface on which said second micromirror is disposed.

7. An optical switch according to claim 1, further comprising a large mirror for reflecting a beam exiting from said input beam direction module such that said beam is led to said output beam direction module.

8. An optical switch according to claim 7, wherein said large mirror includes a concavely curved surface opposite to said input beam direction module.

9. A beam direction module comprising:
   a first supporting member;
   a first collimator supported by said first supporting member for emitting a beam;
   a first substrate disposed adjacent to said supporting member and having a beam passing region through which the beam emitted from said first collimator passes;
   a first micromirror disposed on said first substrate;
   a second substrate disposed opposite to said first substrate; and
   a second micromirror disposed on said second substrate; and
   a mechanism for rotating said first micromirror rotates in a first direction, and rotating said second micromirror in a second direction.

10. An optical switch for switching optical signals propagating through a plurality of optical fibers, said optical switch comprising:
   an input beam direction module including:
   a first supporting member;
   a first collimator supported by said first supporting member for emitting a beam;
   a first substrate disposed adjacent to said supporting member;
   a first micromirror disposed on said first substrate, said first micromirror having a first rotation axis;
   a second substrate disposed opposite to said first substrate; and
   a second micromirror disposed on said second substrate, said second micromirror having a second rotation axis; and
   an output beam direction module for receiving light from said input beam direction module and including: a second supporting member; a second collimator supported by said second supporting member for receiving a beam; and a third substrate disposed opposite to said second supporting member,
   wherein said second micromirror is arranged such that said second rotation axis extends closer to a direction in which the beam exits from said collimator than said first rotation axis, when viewed from a direction in which said first substrate and said second substrate are stacked.

* * * * *